United States Patent
Iwata et al.

(10) Patent No.: US 6,827,496 B2
(45) Date of Patent: Dec. 7, 2004

(54) FOUR-POINT CONTACT BALL BEARING

(75) Inventors: Takashi Iwata, Nara (JP); Yoshitaka Nakagawa, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/228,257

(22) Filed: Aug. 27, 2002

(65) Prior Publication Data

US 2004/0032998 A1 Feb. 19, 2004

(30) Foreign Application Priority Data

Aug. 28, 2001 (JP) .................... P2001-257895
Sep. 3, 2001 (JP) .................... P2001-265865
Sep. 4, 2001 (JP) .................... P2001-267060

(51) Int. Cl.[7] ............................................. F16C 33/58
(52) U.S. Cl. ....................................................... 384/516
(58) Field of Search ................................ 384/513, 516, 384/450

(56) References Cited

U.S. PATENT DOCUMENTS 3,309,157 A    3/1967   Schlueter
3,647,268 A    3/1972   Haines
6,082,906 A *  7/2000   Satou et al. ............... 384/516
6,116,786 A    9/2000   Takata et al.
6,244,408 B1   6/2001   Tobayama et al.
6,273,230 B1   8/2001   Nakano et al.

FOREIGN PATENT DOCUMENTS

DE    3046812 A1    7/1982
WO    WO 99/02873   1/1999

* cited by examiner

*Primary Examiner*—Thomas R. Hannon
(74) *Attorney, Agent, or Firm*—McGinn & Gibb, PLLC

(57) ABSTRACT

A four-point ball bearing includes: an inner ring and an outer ring defining raceway grooves, respectively. Each of the raceway grooves is constituted by two circular arcs different in curvature provided on opposite sides of a widthwise center of the raceway groove. A plurality of balls are arranged between the inner and outer rings so that the balls can roll. In at least one of the raceway grooves, a center of curvature of one of the circular arcs and a center of curvature of the other circular arc are displaced from each other at least in a radial direction so that spin is generated in each of the balls.

20 Claims, 4 Drawing Sheets

FOUR-POINT CONTACT BALL BEARING

BACKGROUND OF THE INVENTION

The present invention relates to a four-point contact ball bearing, for example, used in an electromagnetic clutch, a pulley, etc. in an automobile air conditioner.

In a four-point contact ball bearing of this type, both the curvature radius of a raceway groove of an outer ring and the curvature radius of a raceway groove of an inner ring have been heretofore selected to be 52% of the diameter of each ball to thereby enlarge a contact ellipse between the ball and each of the raceway grooves to prevent resisting moment and peeling. The four-point contact ball bearing has advantages in reduction in weight, size and cost.

In the related-art four-point contact ball bearing, however, the contact area of each ball with the raceway grooves of the inner and outer rings increased because both the curvature radius of the raceway groove of the outer ring and the curvature radius of the raceway groove of the inner ring were selected to be 52% of the diameter of the ball. Hence, there was a problem that heat generated due to sliding was apt to cause burning. Particularly when the four-point contact ball bearing is used in a pulley bearing, an electromagnetic clutch, etc. in an automobile air conditioner, the temperature of the inner ring has a tendency to rise because heat is transmitted to the inner ring from a boss of a compressor. If the temperature of the outer ring is reduced, heat-radiating characteristic is improved. Hence, how to improve the heat-radiating characteristic of the outer ring is the important point for preventing burning.

If both the curvature radius of the groove of the outer ring and the curvature radius of the groove of the inner ring were selected to be equal to 52% of the diameter of the ball in the same manner as in the related-art example, the contact pressure of the raceway groove of the inner ring with the ball became larger than the contact pressure of the raceway groove of the outer ring with the ball because the sectional shape of the raceway groove of the inner ring perpendicular to the axis of the bearing was convex to the ball whereas the sectional shape of the raceway groove of the outer ring perpendicular to the axis of the bearing was concave to the ball. As a result, the contact pressures were unbalanced. Hence, there was also a problem that the peeling life of the ball bearing was shortened.

Further, in the related-art four-point contact ball bearing, each of the raceway grooves of the inner and outer rings was generally formed so as to come into contact with the balls laterally symmetrically with respect to the widthwise center of the raceway groove. Hence, when load was applied on each ball in the condition that the value of offset with respect to the axial centers (i.e., the value of displacement in axial center position between the raceway grooves of the inner and outer rings) was zero, spin was not generated because the ball rotated only in a direction of the circumference of each raceway groove. For this reason, failure in grease supply might occur partially, so that failure in lubrication occurred and resulted in premature burning.

In detail, in FIG. 4, when load is applied on each ball 53 in the condition that the value of offset is zero, the ball 53 decides an axis R parallel with the axial direction of the bearing as its own rotation axis with the rotation of the outer ring 51 or the inner ring 52 so that the ball 53 revolves around the axial center of the bearing on the raceway grooves 51a and 52a while rotating on its own axis R without generation of spin making the ball 53 rotate on its rotation axis inclined with respect to the axial direction of the bearing. For this reason, grease circulated, for example, as represented by the arrow in FIG. 3 with the rotation of the ball 53, etc., so that grease did not go toward the center portion of the ball 53 surrounded by contact points S, T, U and V at which the ball 53 came in contact with the raceway grooves 51a and 52a. As a result, failure in grease supply might occur between the center portion of the ball 53 and each of the outer and inner rings 51 and 52 and a cage 54, so that failure in lubrication occurred and resulted in premature burning.

SUMMARY OF THE INVENTION

Therefore, an object of the invention is to provide a four-point contact ball bearing which is so excellent in heat-radiating characteristic that burning hardly occurs and which is hardly peeled. Another object of the invention is to provide a four-point contact ball bearing in which failure in lubrication can be prevented to make the life of the ball bearing long even in the case where load is applied on each ball in the condition that the value of offset with respect to the axial centers of raceway grooves is zero.

In order to solve the aforesaid object, the invention is characterized by having the following arrangement.

(1) A four-point ball bearing comprising:
an inner ring and an outer ring defining raceway grooves, respectively, each of the raceway grooves being constituted by two circular arcs different in curvature provided on opposite sides of a widthwise center of the raceway groove; and
a plurality of balls arranged between the inner and outer rings so that the balls can roll,
wherein in at least one of the raceway grooves, a center of curvature of one of the circular arcs and a center of curvature of the other circular arc are displaced from each other at least in a radial direction so that spin is generated in each of the balls.

(2) The four-point contact ball bearing according to (1), wherein each of the balls comes into contact with the raceway groove of the inner ring at two points and comes into contact with the raceway groove of the outer ring at two points.

(3) The four-point contact ball bearing according to (2), wherein a curvature radius of the raceway groove of the outer ring is selected to be larger than a curvature radius of the raceway groove of the inner ring.

(4) The four-point contact ball bearing according to (3), wherein the curvature radius of the raceway groove of the inner ring is selected to be in a range from 50.5% to 53.5% of a diameter of the ball, and the curvature radius of the raceway groove of the outer ring is selected to be larger by 2% to 6% of the diameter of the ball than the curvature radius of the raceway groove of the inner ring.

(5) The four-point contact ball bearing according to (3), wherein the curvature radius of the raceway groove of the outer ring is selected to be in a range of from 55% to 56.5% of a diameter of the ball.

(6) A four-point contact ball bearing comprising:
an inner ring and an outer ring defining raceway groove, respectively; and
a plurality of balls arranged between the inner and outer rings so that the balls can roll, each of the balls comes into contact with the raceway groove of the inner ring at two points and comes into contact with the raceway groove of the outer ring at two points,
wherein a curvature radius of the raceway groove of the outer ring is selected to be in a range from 55% to 56.5% of a diameter of the ball.

(7) A four-point contact ball bearing comprising:
an inner ring and an outer ring defining raceway groove, respectively; and
a plurality of balls arranged between the inner and outer rings so that the balls can roll, each of the balls comes into contact with the raceway groove of the inner ring at two points and comes into contact with the raceway groove of the outer ring at two points,
wherein a curvature radius of the raceway groove of the inner ring is selected to be in a range from 50.5% to 53.5% of a diameter of said ball, and a curvature radius of the raceway groove of the outer ring is selected to be larger by 2% to 6% of the diameter of the ball than the curvature radius of the raceway groove of the inner ring.

DETAILED DESCRIPTION OF PREFERRED EMBODIMENTS

Figure 1:
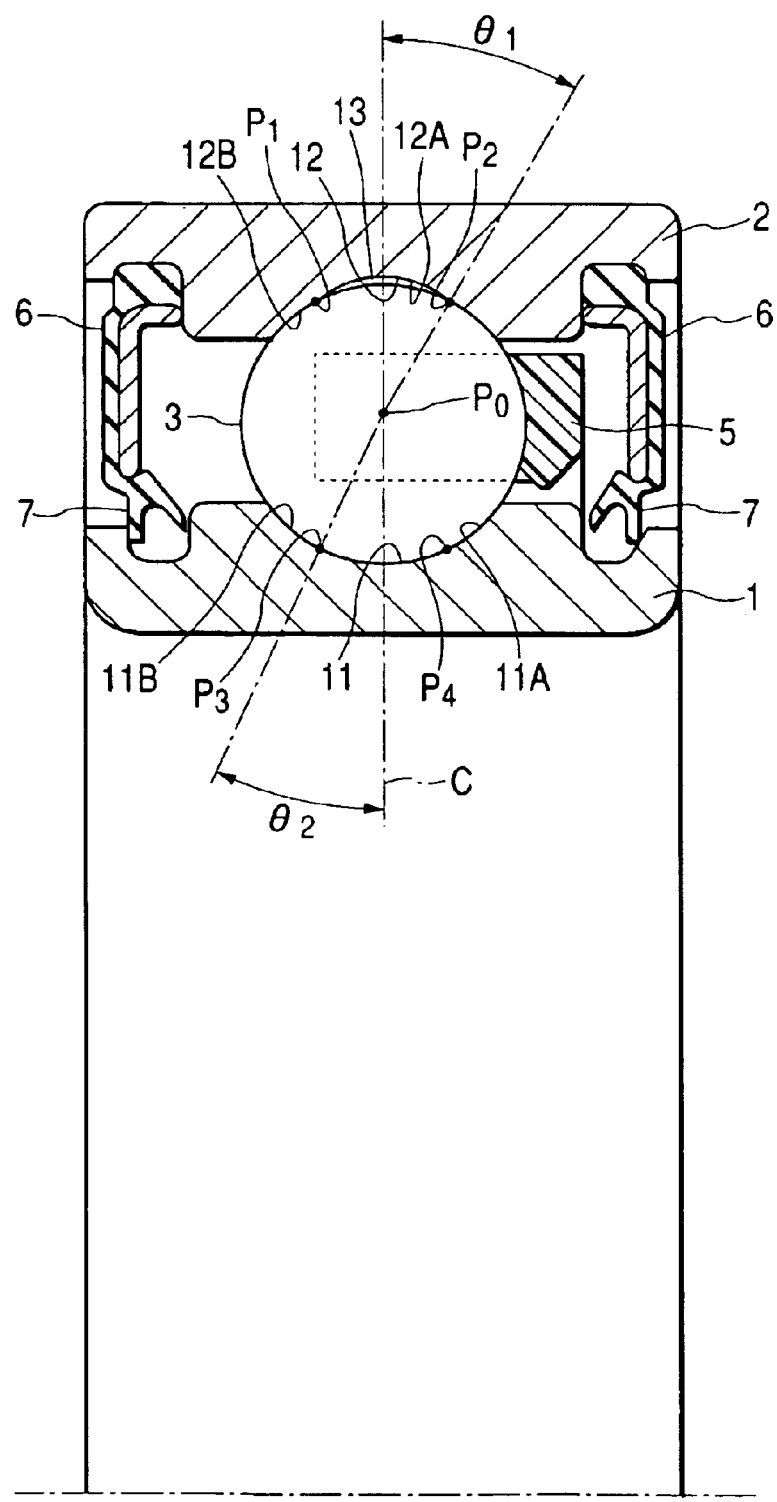
FIG. 1 is a sectional view of a four-point contact ball bearing according to a first embodiment of the invention.

The invention will be described below in detail on the basis of embodiments shown in the drawings.
First Embodiment FIG. 1 is a sectional view showing an embodiment of a four-point contact ball bearing according to the invention. In this embodiment, a plurality of balls 3 are provided between a raceway groove 11 of an inner ring 1 and a raceway groove 12 of an outer ring 2 so as to be arranged at intervals of a predetermined distance in a circumferential direction. The balls 3 are retained in a cage 5. Sealing members 6 are fixed to opposite axial end portions of the outer ring 2. Sealing lips 7 of the sealing members 6 come into frictional contact with cavities formed at opposite axial ends of the inner ring 1.

The raceway groove 11 of the inner ring 1 includes a left portion 11B on the left side (in FIG. 1) of a bearing radial plane C passing through a center P0 of each ball 3, and a right portion 11A on the right side of the plane C. The left portion 11B comes into contact with the ball 3 at a point P3. The right portion 11A comes into contact with the ball 3 at a point P4. In the raceway groove 11 of the inner ring 1, both the left portion 11B and the right portion 11A have a curvature radius equal to 52% of the diameter of the ball 3.

The raceway groove 12 of the outer ring 2 includes a left portion 12B on the left side (in FIG. 1) of a bearing radial plane C passing through a center P0 of each ball 3, and a right portion 12A on the right side of the plane C. The left portion 12B comes into contact with the ball 3 at a point P1. The right portion 12A comes into contact with the ball 3 at a point P2. In the raceway groove 12 of the outer ring 2, both the left portion 12B and the right portion 12A have a curvature radius equal to 56% of the diameter of the ball 3.

Since the curvature radius of the left and right portions 12B and 12A of the raceway groove 12 of the outer ring 2 is selected to be equal to 56% of the diameter of the ball 3 as described above, a large gap 13 is formed between the raceway groove 12 and the outer surface of the ball 3. That is, because the curvature radius of the raceway groove 12 of the outer ring 2 is selected to be larger than the curvature radius of the raceway groove 11 of the inner ring 1, the gap 13 becomes larger than a gap formed between the raceway groove 11 of the inner ring 1 and the inner surface of the ball 3.

Incidentally, the angle θ2 of contact between the ball 3 and the left portion 11B of the raceway groove 11 is set to be equal to the angle of contact between the ball 3 and the right portion 11A of the raceway groove 11. The angle θ1 of contact between the ball 3 and the right portion 12A of the raceway groove 12 is set to be equal to the angle of contact between the ball 3 and the left portion 12B of the raceway groove 12.

In the four-point contact ball bearing according to this embodiment, the curvature radius of the raceway groove 12 of the outer ring 2 is selected to be equal to 56% of the diameter of the ball 3. Hence, the ellipse of contact between the ball 3 and the raceway groove 12 of the outer ring 2 is reduced, so that sliding between the ball 3 and the raceway groove 12 of the outer ring 2 is reduced. As a result, the temperature rise due to the sliding is reduced.

Since the curvature radius of the raceway groove 12 of the outer ring 2 is selected no be equal to 56% of the diameter of the ball 3, the gap 13 formed between the ball 3 and the raceway groove 12 of the outer ring 2 small in curvature compared with the related-art example becomes large. Hence, heat-radiating characteristic between the ball 3 and the raceway groove 12 of the outer ring 2 is improved, so that the temperature rise between the outer ring 2 and the ball 3 can be reduced and, accordingly, the temperature rise at the inner ring 1 can be reduced. Particularly when the four-point contact ball bearing is used as a pulley bearing, an electromagnetic clutch, etc. in an air conditioner, the temperature of the inner ring 1 has a tendency to rise because heat generated in the air conditioner is transmitted from a boss of a compressor to the inner ring 1. The contact area between the ball 3 and the raceway groove 12 of the outer ring 2 is, however, small since the curvature radius of the raceway groove 12 of the outer ring 2 is equal to 56% of the diameter of the ball 3, that is, because the curvature radius of the raceway groove 12 of the outer ring 2 is larger than that in the related art. Therefore, sliding hardly occurs and the gap 13 between the outer ring 2 and the ball 3 becomes large. Hence, the temperature of the outer ring 2 in the four-point contact ball bearing is reduced, so that heat can be effectively radiated from the outer ring 2 side. Accordingly, burning hardly occurs in the four-point contact ball bearing, so that the life of the ball bearing becomes long.

In the four-point contact ball bearing according to the first embodiment, the curvature radius of the raceway groove of the inner ring is selected to be equal to 52% of the diameter of the ball, that is, the curvature radius of the raceway groove of the inner ring is selected to be not smaller than 50.5% of the diameter of the ball. Therefore, the area of contact between the raceway groove of the inner ring and the ball is not excessively large. As a result, sliding between the ball and the raceway groove of the inner ring is not excessively intensive.

The curvature radius of the raceway groove of the inner ring is selected to be equal to 52% of the diameter of the ball, that is, the curvature radius of the raceway groove of the inner ring is selected to be rot larger than 53.5% of the diameter of the ball. Therefore, the contact pressure between the ball and the raceway groove of the inner ring is not excessively large. As a result, peeling hardly occurs.

The curvature radius of the raceway groove of the outer ring is selected to be equal to 56% of the diameter of the ball, that is, because the curvature radius of the raceway groove of the outer ring is selected to be larger by 4% of the diameter of the ball 3 than the curvature radius (equal to 52%) of the raceway groove of the inner ring, the contact pressure of the raceway groove of the inner ring with the ball 3 is not larger than the contact pressure of the raceway groove of the outer ring with the ball 3. As a result, the contact pressure of the raceway groove of the inner ring is balanced with the contact pressure of the raceway groove of the outer ring, so that peeling can be prevented.

Although this embodiment has shown the case where the curvature radius of the raceway groove 12 of the outer ring 2 is selected to be equal to 56% of the diameter of the ball 3, the same effect can be obtained when the curvature radius of the raceway groove 12 of the outer ring 2 is selected to be in a range of from 55%, not inclusively, to 56.5%, inclusively, of the diameter of the ball 3. Although this embodiment has shown the case where the curvature radius of the raceway groove 11 of the outer ring 1 is selected to be equal to 52% of the diameter of the ball 3, the invention is not limited thereto and the curvature radius of the raceway groove 11 of the outer ring may be selected to be equal to 51.5% of a the diameter of the ball 3.

Although this embodiment has shown the case where the curvature radius of the raceway groove 11 of the inner ring 1 is selected to be equal to 52% of the diameter of the ball 3 whereas the curvature radius of the raceway groove 12 of the outer ring 2 is selected to be equal to 56% of the diameter of the ball 3, the same effect can be obtained when the curvature radios of the-raceway groove 11 of the inner ring 1 is selected to be in a range of from 50.5% to 53.5% of the diameter of the ball 3 whereas the curvature radius of the raceway groove 12 of the outer ring 2 is selected to be larger by 2% to 6% of the diameter of the ball 3 than the curvature radius of the raceway groove 11 of the inner ring 1.

As is obvious from the description, in the four-point contact ball bearing according to the invention, the curvature radius of the raceway groove of the outer ring is selected to be a value larger than 55% of the diameter of the ball. Hence, the ellipse of contact between the ball and the raceway groove of the outer ring is reduced, so that sliding between the ball and the raceway groove of the outer ring is reduced. As a result, the temperature rise due to the sliding is reduced.

In the four-point contact ball bearing according to the invention, because he curvature radius of the raceway groove of the outer ring is selected to be a value larger than 55% of the diameter of the ball, the gap formed between the raceway groove of the outer ring and the ball becomes large. Hence, heat-radiating characteristics of the ball and the raceway groove of the outer ring are improved, so that the temperature rise of the raceway groove of the outer ring and the ball can be reduced.

In the four-point contact ball bearing according to the invention, the curvature radius of the raceway groove of the outer ring is selected to be not larger than 56.5% of the diameter of the ball. Hence, the contact pressure between the raceway groove of the outer ring and the ball is not excessively large. As a result, the peeling life can be prevented from being shortened.

As is obvious from the description, in the four-point contact ball bearing according to the invention, because the curvature radius of the raceway groove of the inner ring is selected to be not smaller than 50.5% of the diameter of the ball, the area of contact between toe raceway groove of the inner ring and the ball is not excessively large. As a result, sliding between the ball and the raceway groove of the inner ring is not excessively intensive.

Further, in the four-point contact ball bearing according to the invention, because the curvature radius of the raceway groove of the inner ring is selected to be not larger than 53.5% of the diameter of the ball, the contact pressure between the ball and the raceway groove of the inner ring is not excessively large. As a result, peeling can be prevented from occurring due to the contact pressure between the ball and the raceway groove of the inner ring.

Further, in the four-point contact ball bearing according to the invention, because the curvature radius of the raceway groove of the outer ring is selected to be larger by 2% to 6% of the diameter of the ball than the curvature radius of the raceway groove of the inner ring, the contact pressure of the raceway groove of the inner ring with the ball can be balanced with the contact pressure of the raceway groove of the outer ring with the ball, differently from the related-art example in which contact pressures were unbalanced because the curvature radius of the raceway groove of the inner ring was selected to be equal to the curvature radius of the raceway groove of the outer ring. As a result, peeling can be prevented.

Further, in the four-point contact ball bearing according to the invention, because the curvature radius of the raceway groove of the inner ring is selected to be in a range of from 50.5% to 53.5% of the diameter of the ball whereas the curvature radius of the raceway groove c the outer ring is selected to be larger by 2% to 6% of the diameter of the ball than the curvature radius of the raceway groove of the inner ring, the ellipse of contact between the ball and the raceway groove of the outer ring is reduced. As a result, sliding between the ball and the raceway groove of the outer ring is reduced, so that the temperature rise due to the sliding is reduced.

In the four-point contact ball bearing according to the invention, because the curvature radius of the raceway groove of the inner ring is selected to be in a range of from 50.5% to 53.5% of the diameter of the ball whereas the curvature radius of the raceway groove of the outer ring is selected to be larger by 2% to 6%, of the diameter of the ball than the curvature radius of the raceway groove of the inner ring, the gap formed between the raceway groove of the outer ring and the ball becomes large. As a result, heat-radiating characteristic of the ball and the raceway groove of the outer ring is improved, so that the temperature rise of the raceway groove of the outer ring and the ball can be reduced.

Further, in the four-point contact ball bearing according to the invention, because the curvature radius of the raceway groove of the outer ring is selected to be not large than 59.5% of the diameter of the ball, the contact pressure between the raceway groove of the outer ring and the ball is not excessively small. As a result, the peeling life can be prevented from being shortened.

Second Embodiment

Figure 2:
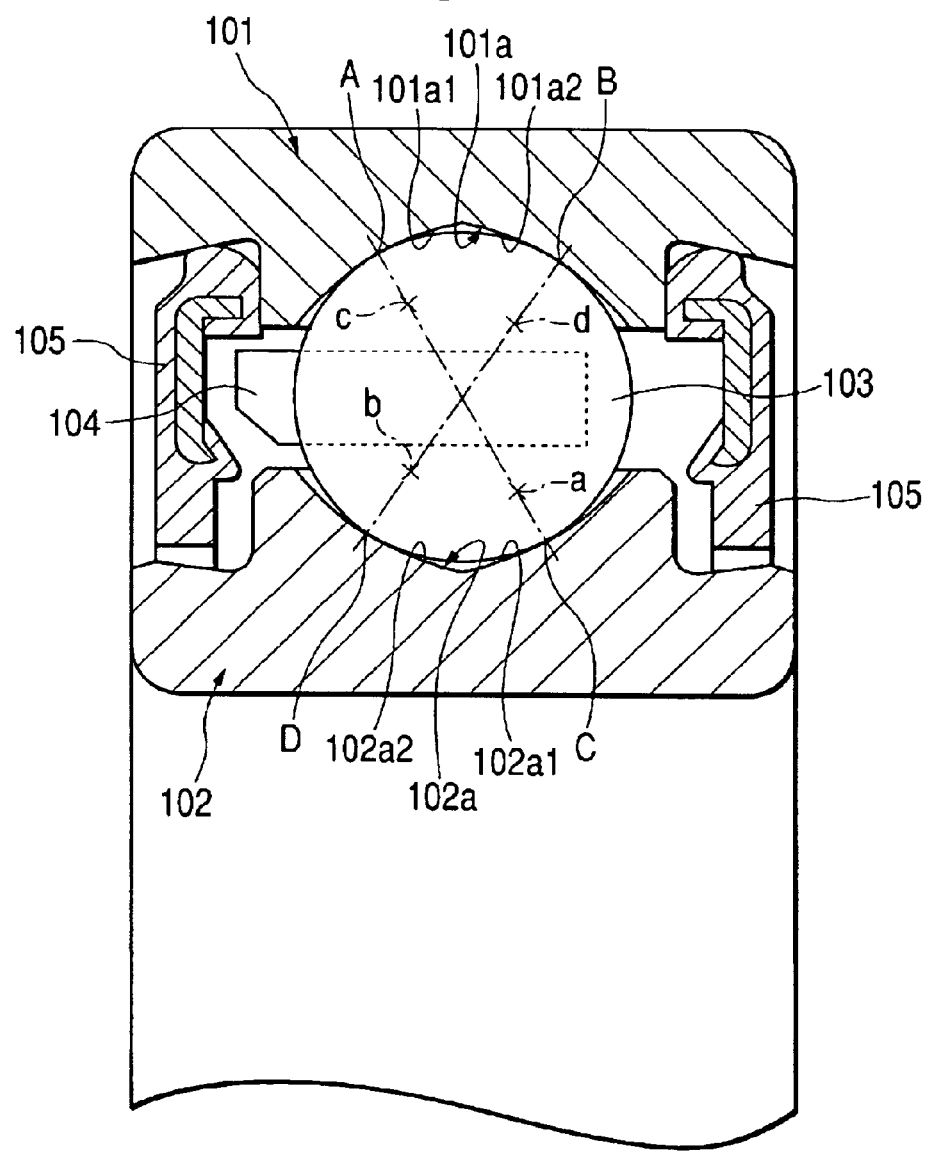
FIG. 2 is a sectional view showing a four-point contact ball bearing according to a second embodiment of the invention.

FIG. 2 is a sectional view showing a four-point contact ball bearing according to a second embodiment of the invention. In FIG. 2, the four-point contact ball bearing according to this embodiment has outer and inner rings 101 and 102 as raceway grooves, balls 103 arranged between the outer and inner rings so as to be able to roll, a cage 104, and sealing plates 105 for sealing ring-like opening portions between the outer and inner rings.

The outer ring 101 includes a raceway groove 101a. Two circular arcs 101a1 and 101a2 different in curvature are provided on opposite sides of the widthwise (left-and-right direction in FIG. 2) center of the raceway groove 101a. The left and right circular arcs 101a1 and 101a2 come in contact with each ball 103 at points A and B respectively. Similarly, the inner ring 102 has a raceway groove 102a. Two circular arcs 102a1 and 102a2 different in curvature are provided on opposite sides of the widthwise center of the raceway groove 102a. The left and right circular arcs 102a2 and 102a1 come in contact with each ball 103 at points D and C respectively.

In the raceway groove 101a, the centers a and b of curvature of the circular arcs 101a1 and 101a2 are slightly displaced in radial (up-and-down direction in FIG. 2) and axial (left-and-right direction in FIG. 2) directions of the ball bearing from each other, so that spin is generated in each ball 103 at the time of rotation of the ball bearing. Similarly, in the raceway groove 102a, the centers c and d of curvature 15; of the circular arcs 102a1 and 102a2 are slightly displaced in radial and axial directions of the ball bearing from each other, so that spin is generated in each ball 103 at the time of rotation of the ball bearing. That is, since the curvature centers a and b and the curvature centers c and d are provided differently as described above, the state of contact between the ball 103 and each of the raceway grooves 101a and 102a at the time of rotation of the ball bearing is made laterally asymmetrical with respect to the axial center (the widthwise center of the raceway groove). As a result, difference can be produced between frictional force acting or the ball 103 from the left circular arcs 101a1 and 102a2 at the contact points A and D and frictional force acting on the ball 103 from the right circular arcs 101a2 and 102a1 at the contact points B and C. As a result, the rotation axis of the ball 103 is inclined with respect to the axial direction of the bearing, so that spin can be generated in the ball 103.

Figure 3:
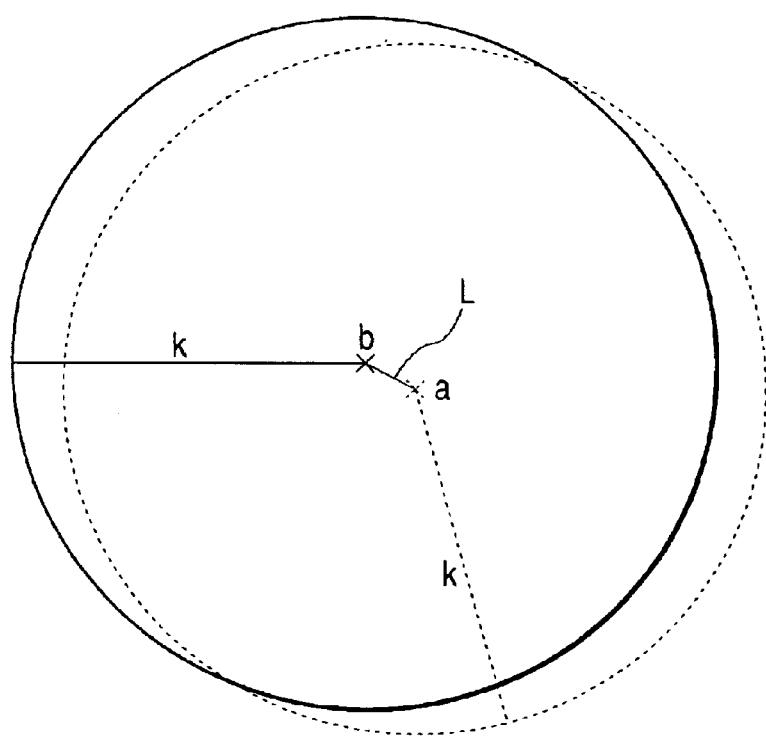
FIG. 3 is an explanatory view showing centers of curvature of left and right circular arcs in the outer ring depicted in FIG. 2.
Figure 4:
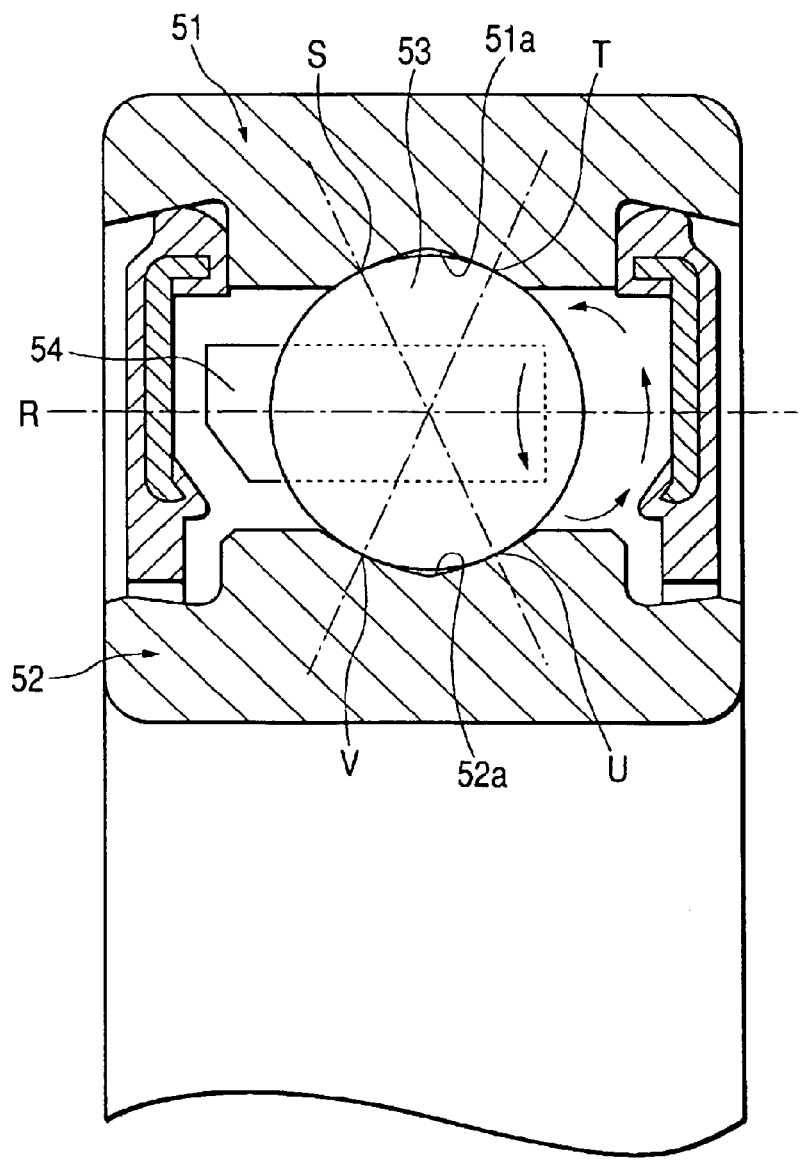
FIG. 4 is an explanatory view for explaining a problem in a related-art four-point contact ball bearing.

As shown in FIG. 3, for example, the length L of displacement between the curvature centers a and b is selected to be not larger than 0.1% of the curvature radius k of each of the circular arcs 101a1 and 101a2. When the length of displacement between the curvature centers is selected to be not larger than 0.1% of the curvature radius as described above, reduction in the life of the bearing, increase in rolling noise, and so on, can be restrained.

As described above, in the four-point contact ball bearing according to the second embodiment, spin is generated in each ball 103 at the time of rotation of the ball bearing. Hence, the point of difference from the ball bearing described above in the related art is as follows. That is, even in the case where load is applied on the ball 103 in the condition that the value of offset with respect to the axial centers of the raceway grooves 101a and 102a is zero, failure in grease supply car be prevented from occurring between the center portion of the ball 103 and each of the outer and inner rings 101 and 102 and the cage 104. As a result, failure in lubrication can be prevented from occurring, so that the life of the ball bearing can be made long. Since failure in lubrication can be prevented even in the case where load is applied on each ball in the condition that the value of offset with respect to the axial centers of the raceway grooves 101a and 102a is zero, the four-point contact ball bearing according to this embodiment can be preferably used as a bearing for rotatably bearing a long-size rotary shaft long in an axial direction. As a result, when the four-point contact ball bearing according to this is used as a substitute for two deep groove ball bearings in a device such as an electromagnetic clutch in which the two deep groove ball bearings were used in the related art for bearing a long-size rotary shaft, reduction in size of the device, space saving, reduction in cost, and so on, can be achieved.

Although description has been made upon the configuration that the curvature center a or d of the left circular arc 101a1 or 102a2 and the curvature center b or c of the right circular arc 101a2 or 102a1 in each of the raceway grooves 101a and 102a of the outer and inner rings 101 and 102 are displaced in radial and axial directions from each other, the invention is not limited thereto if spin can be always generated in each ball 103 at the time of rotation. Specifically, for example, only in the raceway groove 10a of the outer ring 101, the curvature centers a and b of the left and right circular arcs 101a1 and 101a2 may be displaced at least in an axial direction from each other so that spin can be generated in each ball. Although description has been made upon the case where the left and right circular arcs 101a1 and 101a2 are formed by one and the same curvature radius k, the invention may be applied also to the case where curvature radii of the left and right circular arcs are made different from each other. Further, as mentioned in the first embodiment, the curvature radius of the raceway groove of the outer ring may be selected to be larger than the curvature radius of the raceway groove of the inner ring. Specifically, the curvature radius of the raceway groove of the inner ring may be selected to be in a range from 50.5% to 53.5% of a diameter of the ball, and the curvature radius of the raceway groove of the outer ring is selected to be larger by 2% to 6% of the diameter of the ball than the curvature radius of the raceway groove of the inner ring. Alternately, the curvature radius of the raceway groove of the outer ring may be selected to be in a range of from 55% to 56.5% of a diameter of the ball.

As described above, in the four-point contact ball bearing according to the invention, failure in grease supply can be prevented from occurring partially even in the case where load is applied on each ball in the condition that the value of offset with respect to the axial centers of the raceway grooves is zero. Hence, failure in lubrication can be prevented, so that the life of the ball bearing can be made long.

What is claimed is:

1. A four-point contact ball bearing comprising:
   an inner ring and an outer ring defining raceway grooves, respectively, each of the raceway grooves comprising:
   two circular arcs different in curvature provided on opposite sides of a widthwise center of the raceway groove; and
   a plurality of balls arranged between the inner and outer rings so that the balls can roll,
   wherein in at least one of the raceway grooves, a center of curvature of one of the circular arcs and a center of curvature of the other circular arc are displaced from each other at least in a radial direction so that spin is generated in each of the balls,
   wherein a curvature radius of the raceway groove of the outer ring is selected to be greater than 55% and not greater than 56.5% of a diameter of the ball.

2. The four-point contact ball bearing according to claim 1, wherein each of the balls comes into contact with the raceway groove of the inner ring at two points and comes into contact with the raceway groove of the outer ring at two points.

3. The four-point contact ball bearing according to claim 2, wherein a curvature radius of the raceway groove of the outer ring is selected to be larger than a curvature radius of the raceway groove of the inner ring.

4. The four-point contact ball bearing according to claim 3, wherein the curvature radius of the raceway groove of the inner ring is selected to be in a range from 50.5% to 53.5% of a diameter of the ball, and the curvature radius of the raceway groove of the outer ring is selected to be larger by 2% to 6% of the diameter of the ball than the curvature radius of the raceway groove of the inner ring.

5. The four-point contact ball bearing according to claim 4, wherein the raceway groove of the inner ring comprises a curvature radius that is 52% of the diameter of said ball.

6. The four-point contact ball bearing according to claim 4, wherein the raceway groove of the outer ring comprises a curvature radius that is larger than the curvature radius of said inner ring by 4% of the diameter of said ball.

7. The four-point contact ball bearing according to claim 1, wherein a center of curvature of each of said circular arcs of said inner ring and said outer ring are displaced in radial and axial directions of said plurality of balls.

8. The four-point contact ball bearing according to claim 7, wherein a rotational axis of each of said plurality of balls is inclined with respect to the axial direction of the four-point contact ball bearing.

9. The four-point contact ball bearing according to claim 7, wherein a length of displacement between said center of curvature of each of said circular arcs is not greater than 0.1% of said curvature radius of each of said circular arcs.

10. The four-point contact ball bearing according to claim 1, wherein the raceway groove of the outer ring comprises a curvature radius that is 56% of the diameter of said ball.

11. A four-point contact ball bearing comprising:
an inner ring and an outer ring defining raceway grooves, respectively; and
a plurality of balls arranged between the inner and outer rings so that the balls can roll, each of the balls coming into contact with the raceway groove of the inner ring at two points and coming into contact with the raceway groove of the outer ring at two points,
wherein a curvature radius of the raceway groove of the outer ring is selected to be greater than 55% and not greater than 56.5% of a diameter of the ball.

12. A four-point contact ball bearing comprising:
an inner ring and an outer ring defining raceway grooves, respectively; and
a plurality of balls arranged between the inner and outer rings so that the balls can roll, each of the balls coming into contact with the raceway groove of the inner ring at two points and coming into contact with the raceway groove of the outer ring at two points,
wherein a curvature radius of the raceway groove of the inner ring is selected to be in a range from 50.5% to 53.5% of a diameter of said ball, and a curvature radius of the raceway groove of the outer ring is selected to be greater than 55% and not greater than 56.5%.

13. A four-point ball contact ball bearing comprising:
an inner ring defining an inner raceway groove having a radius of curvature;
an outer ring defining an outer raceway groove having a radius of curvature that is larger that of the inner raceway groove; and
a plurality of balls arranged between the inner ring and the outer ring so that the balls can roll,
wherein the radius of curvature of the outer ring provides a gap between the outer ring and the plurality of balls that is larger than a gap between the inner ring and the plurality of balls.

14. The four-point contact ball bearing according to claim 13, wherein each of the balls comes into contact with the raceway groove of the inner ring at two points and comes into contact with the raceway groove of the outer ring at two points.

15. The four-point contact ball bearing according to claim 13 wherein the curvature radius of the raceway groove of the inner ring is selected to be in a range from 50.5% to 53.5% of a diameter of the ball, and the curvature radius of the raceway groove of the outer ring is selected to be larger by 2% to 6% of the diameter of the ball than the curvature radius of the raceway groove of the inner ring.

16. The four-point contact ball bearing according to claim 13, wherein the raceway groove of the outer ring comprises a curvature radius that is 56% of the diameter of said ball.

17. The four-point contact ball bearing according to claim 13, wherein the raceway groove of the inner ring comprises a curvature radius that is 52% of the diameter of said ball.

18. The four-point contact ball bearing according to claim 13, wherein the raceway groove of the outer ring comprises a curvature radius that is larger than the curvature radius of said inner ring by 4% of the diameter of said ball.

19. The four-point contact ball bearing according to claim 13, wherein an outer surface of contact between each of said plurality of balls and said outer ring is smaller than an inner surface of contact between each of said plurality of balls and said inner ring.

20. The four-point contact ball bearing according to claim 13, wherein a contact pressure of said inner ring is balanced with a contact pressure of said outer ring.

* * * * *